US008708593B2

(12) United States Patent
Stratton (10) Patent No.: US 8,708,593 B2
(45) Date of Patent: Apr. 29, 2014

(54) CROSS-FLEXURAL PIVOT (75) Inventor: Eric M. Stratton, Granite Bay, CA (US)

(73) Assignee: Eric M. Stratton, Granite Bay, CA (US)

(*) Notice: Subject to any disclaimer, the term of this patent is extended or adjusted under 35 U.S.C. 154(b) by 441 days.

(21) Appl. No.: 13/011,209

(22) Filed: Jan. 21, 2011

(65) Prior Publication Data

US 2011/0188926 A1 Aug. 4, 2011

Related U.S. Application Data (60) Provisional application No. 61/301,283, filed on Feb. 4, 2010.

(51) Int. Cl.
F16C 11/04 (2006.01)

(52) U.S. Cl.
USPC .......................... 403/119; 403/220

(58) Field of Classification Search
USPC ............... 403/57, 111, 119, 220, 223, 291; 464/51, 100, 162; 267/133, 160
See application file for complete search history.

(56) References Cited

U.S. PATENT DOCUMENTS

| | | | |
|---|---|---|---|
| 854,426 A * | 5/1907 | Lowry | |
| 3,140,614 A * | 7/1964 | Willis | 403/291 X |
| 3,482,466 A * | 12/1969 | Kales et al. | |
| 3,700,289 A | 10/1972 | Bilinski et al. | |
| 4,405,184 A * | 9/1983 | Bahiman | 403/291 |
| 4,655,629 A | 4/1987 | Flaherty | |
| 4,825,713 A | 5/1989 | Wilkey | |
| 6,283,666 B1 * | 9/2001 | Genequand | 403/119 |
| 6,963,472 B2 * | 11/2005 | He et al. | |
| 7,044,459 B2 * | 5/2006 | Watson | |
| 7,090,683 B2 | 8/2006 | Brock et al. | |
| 7,097,140 B2 | 8/2006 | Staley et al. | |
| 7,214,230 B2 | 5/2007 | Brock et al. | |
| 7,371,210 B2 | 5/2008 | Brock et al. | |
| 7,458,172 B2 * | 12/2008 | Aveni | |
| 7,515,385 B1 * | 4/2009 | Abrahamson et al. | |
| 2007/0049800 A1 | 3/2007 | Boulais | |
| 2008/0287741 A1 | 11/2008 | Ostrovsky et al. | |

OTHER PUBLICATIONS

"Annular." Merriam-Webster. [online], [retrieved on Jul. 22, 2013]. Retrieved from the Internet <URL: http://www.merriam-webster.com/dictionary/annular>.*
"Enclose." Merriam-Webster. [online], [retrieved on Jul. 22, 2013]. Retrieved from the Internet <URL: http://www.merriam-webster.com/dictionary/enclose>.*

(Continued)

Primary Examiner — Gregory Binda
Assistant Examiner — Josh Skroupa
(74) Attorney, Agent, or Firm — Jeffrey K. Riddle; Van Colt, Bagley, Cornwall & McCarthy P.C.

(57) ABSTRACT

A cross-flexural pivot includes a first structure with a first longitudinal axis; a second structure with a second longitudinal axis; an inner flexure member, and an outer flexure member. The inner flexure member includes a face disposed obliquely to the first and second longitudinal axes and is coupled to the first structure at a first side and the second structure at a second side opposing the first side. The outer flexure member includes a tubular face surrounding the inner flexure member, the tubular face being disposed obliquely to the first and second longitudinal axes. The outer flexure member is coupled to the first structure at the second side and to the second structure at the first side.

16 Claims, 12 Drawing Sheets (56) References Cited

OTHER PUBLICATIONS

"Ring." Merriam-Webster. [online], [retrieved on Jul. 22, 2013]. Retrieved from the Internet <URL: http://www.merriam-webster.com/dictionary/ring>.*

"Tube." Merriam-Webster. [online], [retrieved on Jul. 22, 2013]. Retrieved from the Internet <URL: http://www.merriam-webster.com/dictionary/tube>.*

"Tunnel." Merriam-Webster. [online], [retrieved on Jul. 22, 2013]. Retrieved from the Internet <URL: http://www.merriam-webster.com/dictionary/tunnel>.*

Henein et al., "Flexure Pivot for Aerospace Mechanisms," 10th European Space Mechanisms and Tribology Symposium (Sep. 24, 2003).

Barry A. Gin, "The Design and Analysis of a Large Angular Range, Two-Axis Flexure Assembly," Mass. Inst. of Tech. M.S./B.S. Thesis (Feb. 1988).

Brian Trease, "Flexures: Lecture Summary," University of Michigan Compliant System Design Laboratory (Apr. 30, 2004) (available at http://www-personal.umich.edu/~btrease/share/me599/Flexures_Overview_by_Trease.doc).

Brian D. Jensen et al., "The Modeling of cross-axis flexural pivots," 37 Mechanism & Machine Theory 461-476 (2002).

* cited by examiner

Fig. 10A    Fig. 10B    Fig. 10C

CROSS-FLEXURAL PIVOT

CROSS-REFERENCE TO RELATED APPLICATION

The present application claims priority pursuant to 35 U.S.C. §119(e) from U.S. Provisional Patent Application Ser. No. 61/301,283, the entire disclosure of which is hereby incorporated by reference.

BACKGROUND

Traditional mechanical pivot joints are typically fabricated by assembling rigid components so as to allow at least one of the components to rotate with respect to the other of the components in a controlled manner. However, traditional mechanical pivot joints typically suffer from the disadvantage of friction between the moving components. This friction can be the source of many problems, including component wear and the need for lubrication. The component wear caused by friction in a traditional mechanical pivot joint negatively affects the reliability and life of the joint. Additionally, the use of lubrication in traditional mechanical joints to reduce the negative effects of friction may result in a joint leaching harmful lubrication material into its surrounding environment. Furthermore, the need for lubrication in a traditional mechanical joint may increase the maintenance requirements associated with keeping the joint in working order.

A flexural pivot joint is a type of joint that allows for a first component to pivot with respect to a second component without the use of moving parts. Flexural pivot joints enable pivoting motion due to the flexibility of the material from which the flexural pivot joint is made. While flexural pivot joints can overcome many of the limitations associated with traditional mechanical pivot joints, a reliable, inexpensive, easy-to-manufacture flexural pivot joint with a pivot axis perpendicular to the longitudinal axis of the pivot joint has not yet been produced.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIGS. 2A and 213 are side views of an illustrative cross-flexural pivot in different states of flexure, according to one example of principles described herein.

Throughout the drawings, identical reference numbers designate similar, but not necessarily identical, elements.

DETAILED DESCRIPTION

The present specification discloses a cross-flexural pivot. The pivot includes a first structure having a first longitudinal axis, a second structure having a second longitudinal axis, an inner flexure member, and an outer flexure member. The inner flexure member includes a face disposed obliquely to the first and second longitudinal axes, the inner flexure member being coupled to the first structure at a first side and coupled to the second structure at a second side opposing the first side. The outer flexure member includes a curved periphery enclosing the inner flexure member and a face disposed obliquely to the first and second longitudinal axes, the outer flexure member being coupled to the first structure at the second side and to the second structure at the first side.

The present specification further discloses methods of fabricating and using the above-described cross-flexural pivot. One example of a method of fabricating a cross-flexural pivot includes: a) forming, an assembly having an inner body placed concentrically within a tubular outer body, the assembly including a first portion and a second portion; b) making a profile cut in the assembly of the inner body and the outer body such that each of the inner body and the outer body includes a flexure member extending from a first side of the assembly at the first portion to a second side of the assembly at the second portion; and c) rotating one of the bodies in the assembly with respect to the other of the bodies within the assembly.

Another example of a method of fabricating a cross-flexural pivot includes: a) forming a composite tubular body around a mandrel, the tubular body having a first flexure member extending from a lower portion of the tubular body at a first side to an upper portion of the tubular body at a second side, the second side opposing the first side; b) covering the first flexure member with a removable layer; c) forming a second flexure member over the sacrificial layer, the second flexure member extending from the lower portion of the tubular body at the second side to the upper portion of the tubular body at the first side; d) curing the tubular body; and e) removing the removable layer.

The cross-flexural pivot and methods of fabricating a cross-flexural pivot described in the present specification provide numerous advantages over other pivots known in the art. For example, the cross-flexural pivot of the present specification requires no lubrication. As such, no lubrication seeps into the environment surrounding the pivot. Without the need of lubrication, the joint can operate in a vacuum. Furthermore, because the joint does not need to be sealed from partial infiltration, the pivot can operate in harsh environments.

The cross-flexural pivot also has no rubbing surfaces. This property, coupled with the fact that the pivot may be manufactured from robust materials, provides the advantage of minimal wear. Thus, operation of the cross-flexural pivot produces few or no wear particles to contaminate the environment in which it is placed. As such, the cross-flexural pivot is ideal for use in sensitive environments, including clean rooms and the human body, which are particularly sensitive to the introduction of wear particle contamination. Additionally, the fact that the cross-flexural pivot has no rubbing surfaces eliminates the danger of stiction between pivot components, which typically renders a pivot unusable for its intended purpose.

As a further advantage, the cross-flexural pivot of the present specification can be manufactured from a variety of different materials, including metals, plastics, and composite materials. The present specification describes a method of forming a stable cross-flexural pivot joint from native composite material.

Yet another advantage associated with the cross-flexural pivot described herein is that of simple manufacture. As will be shown in greater detail below, the cross-flexural pivot described herein may be manufactured by creating a planar profile cut in an assembly having an inner body and an outer body, and then rotating one of the bodies with respect to the other. Furthermore, the cross-flexural pivot does not require any extra linear springs, as energy storage is integrated directly into the structure of the pivot itself. As also described in the present specification, the cross-flexural pivot joint may be manufactured from native composite material as an integral piece without need of metal inserts. The simplicity of manufacture associated with the cross-flexural pivot described herein allows for inexpensive large-scale production of the pivot with the ability to easily scale the dimensions of the pivot to fit a desired application.

As used in the present specification and in the appended claims, the term "cross-flexural pivot" refers to a device in which a first structure is flexibly coupled to a second structure by flexure members which cross each other on at least one axis.

As used in the present specification and in the appended claims, the term "flexure member" refers to a flexible structural element interconnecting two bodies or to a pair of interrelated flexible structural elements interconnecting two bodies, where each of the interrelated flexible structural elements couples to each of the two bodies at substantially the same locations.

As used in the present specification and in the appended claims, the term "disposed obliquely" refers to the disposition of an element at an angle that is not perpendicular or parallel to another element. For example, if element A is "disposed obliquely" to element B, element A is disposed at an angle that is not perpendicular or parallel to element B. It should further be understood that when a flexure member of a pivot is described as being "disposed obliquely" to a certain axis, the description refers to the disposition of the flexure member at a state of rest. Thus, a flexure member that is not perpendicular or parallel to a certain axis at rest, but may incidentally become perpendicular or parallel to that axis when the flexure member is flexed, is "disposed obliquely" to that axis for the purposes of the present specification and the appended claims.

As used in the present specification and in the appended claims, the term "longitudinal axis" refers to an axis which runs parallel to the length of an element.

As used in the present specification and in the appended claims, the term "periphery" refers to the outer boundary or surface of an element.

As used in the present specification and in the appended claims, the term "filament" refers broadly to any fiber, wire, thread, or flexible threadlike material that can be wrapped around a mandrel or other rod-like body.

Figure 1A:
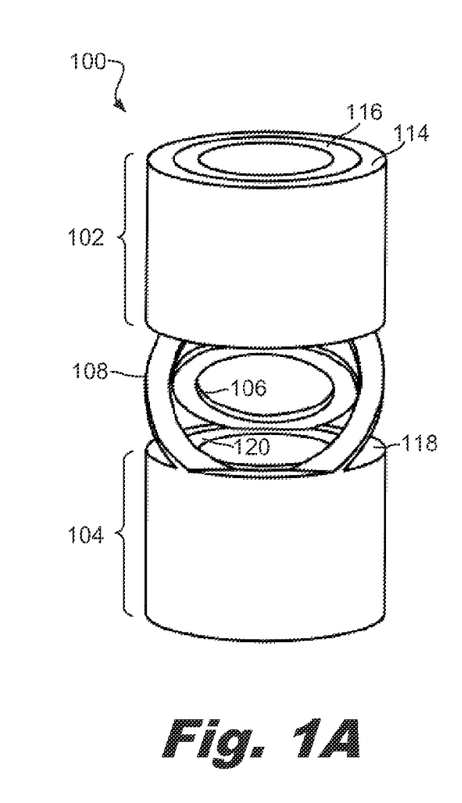
FIGS. 1A, 1B, and 1C are different perspective views of an illustrative cross-flexural pivot, according to one example of principles described herein.
Figure 1B:
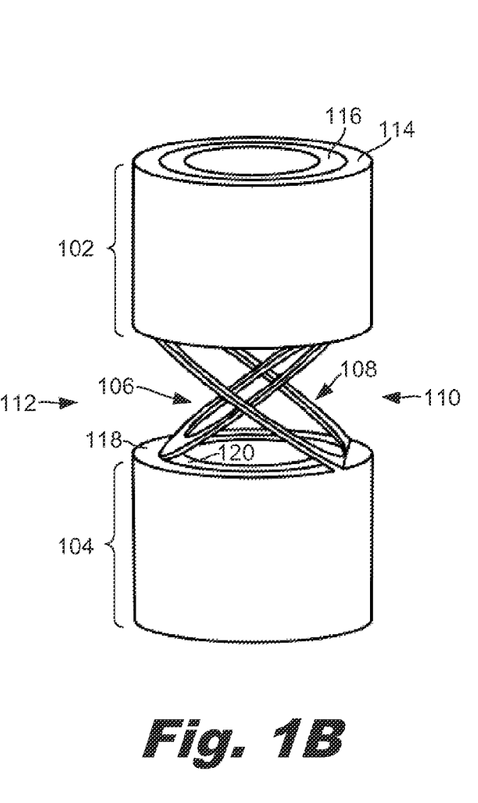
Figure 1C:
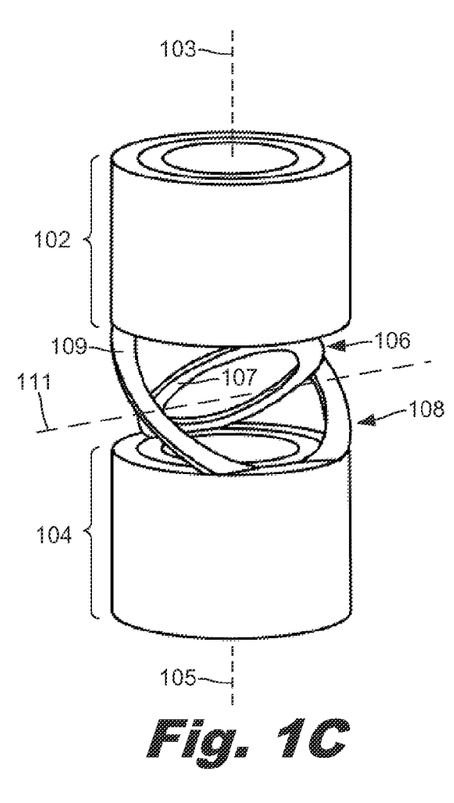

With reference now to FIGS. 1A, 1B, and 1C, various perspective views of an illustrative cross-flexural pivot (100) are shown. The cross-flexural pivot (100) includes a first structure (102) having a first longitudinal axis (103), a second structure (104) having a second longitudinal axis (105), an inner flexure member (106), and an outer flexure member (108).

The inner flexure member (106) includes a substantially flat annular face (107) disposed obliquely to the first and second longitudinal axes (103, 105), as measured when the cross-flexural pivot is at rest (i.e., not flexed). The inner flexure member (106) is coupled to the first structure (102) at a first side (110) and coupled to the second structure (104) at a second side (112), the second side (112) opposing the first side (110).

The outer flexure member (108) has a curved periphery that encloses the inner flexure member (106). In other words, the outer edge of the outer flexure member (108), including the portion of the outer flexure member (108) that couples to each of the first and second structures (102, 104), surrounds the inner flexure member (106). The outer flexure member (108) also has a substantially annular, substantially flat face (109) disposed obliquely to the first and second longitudinal axes 103, 105), as measured when the cross-flexural pivot is at rest. The outer flexure member (108) is coupled to the first structure (102) at the second side (112) and to the second structure (104) at the first side (110).

The first and second structures (102, 104) of the cross-flexural pivot (100) shown in FIGS. 1A-1C are configured to pivot with respect to each other about a pivot axis (111) that is substantially perpendicular to the longitudinal axes (103, 105), taken when the cross-flexural pivot (100) is at rest.

In the illustrative cross-flexural pivot (100) shown in FIGS. 1A-1C, the first and second structures (102, 104), the inner flexure member (106), and the outer flexural member (108) are all tubular and cylindrical. Each of the first and second structures (102, 104) includes an outer tubular body (114, 118, respectively) and an inner tubular body (116, 120, respectively) disposed within the outer tubular body (114, 118, respectively). The inner flexure member (106) couples the inner tubular bodies (116, 120) of the first and second structures (102, 104), and the outer flexure member (108) couples the outer tubular bodies (114, 118) of the first and second structures (102, 104).

With this configuration, the cross-flexural pivot (100) can be fabricated from a simple tube-in-tube configuration of cylindrical stock material, as is explained in more detail below. Furthermore, this configuration of the cross-flexural pivot (100) provides an access channel (122) for wiring, actuation, and/or tool advancement. For instance, the cross-flexural pivot (100) may be used in a snake-like or hyper-redundant device to advance a tool through the human body during a medical operation.

As previously mentioned, the cross-flexural pivot (100) may be fabricated from a wide variety of materials, as may best suit a particular application of these principles. For example, the cross-flexural pivot (100) may be fabricated from materials such as, but not limited to, metals, metal alloys, plastics, composite materials, and combinations thereof.

In certain examples, all or part of the cross-flexural pivot (100) may be fabricated out of a "shape memory" alloy. "Shape memory" alloys are known in the art, and do not exhibit fatigue because they deform plastically. One example of a suitable shape memory alloy is Nitinol, which is made of approximately 55% nickel and 45% titanium. Other suitable shape memory alloys include, but are not limited to an alloy of approximately 52.5% and 47.5% Cadmium; an alloy of 80% indium and 20% titanium; and various combinations of copper, zinc, aluminum, and nickel. The use of shape memory alloys in the cross-flexural pivot (100) in some examples may enable thermal actuation of the cross-flexural pivot (100) using the thermal memory properties of the shape memory alloy. For example, a cross-flexural pivot (100) made of a shape memory alloy may be heated on one side, thereby deforming that side of the cross-flexural pivot (100) and actuating the pivot (100) to pull the first structure (102) and/or the second structure (104) in the direction of the heat. The other side of the cross-flexural pivot (100) may act as an opposing spring that exhibits a force pulling the pivot (100) back into position. Similarly, to pull the cross-flexural pivot (100) in the other direction, the other side of the cross-flexural pivot (100) may be heated.

The material out of which the cross-flexural pivot (100) is fabricated may be selected based on factors such as desired amount of flexibility, durability, ease of manufacture, and cost. For ease of manufacturing, all elements of the cross-flexural pivot (100) may be fabricated out of the same material. Alternatively, it is also contemplated that different materials may be used for different components of the cross-flexural pivot (100).

Figure 2A:
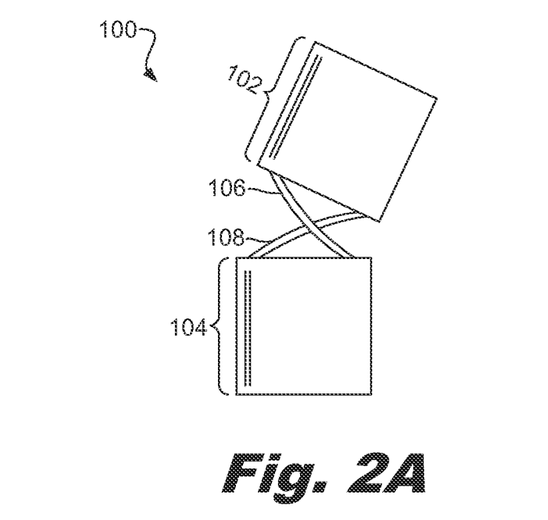
Figure 2B:
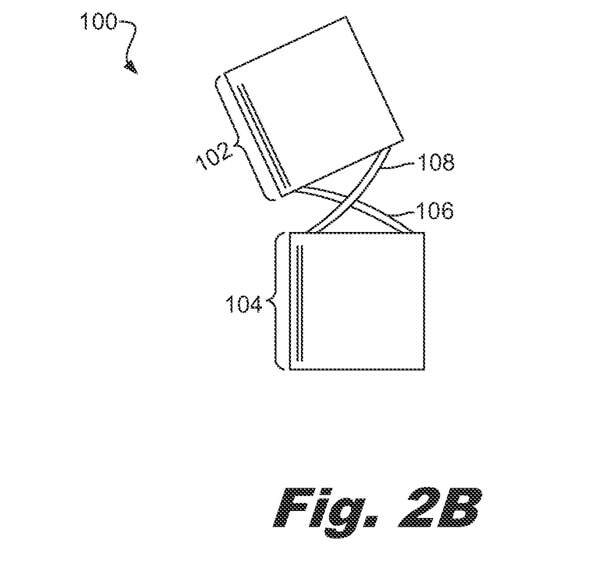

FIGS. 2A and 2B are side views of the illustrative cross-flexural pivot (100) of FIGS. 1A-C in different states of flexure about its pivot axis (111, FIG. 1C). The range of pivot motion in the cross-flexural pivot (100) may be at least partially dependent on the material and dimensions of the inner and outer flexure members (106, 108). For instance, where a range of motion of 180 degrees about the pivot axis (111, FIG. 1C) is desired, the inner and outer flexure members (106, 108) may be manufactured out of a very flexible material and/or given longer dimensions. By contrast, where a more limited range of motion and a more rigid flexibility are desired, the inner and outer flexure members (106, 108) may be fabricated from a less flexible material and/or have shorter dimensions.

Figure 3:
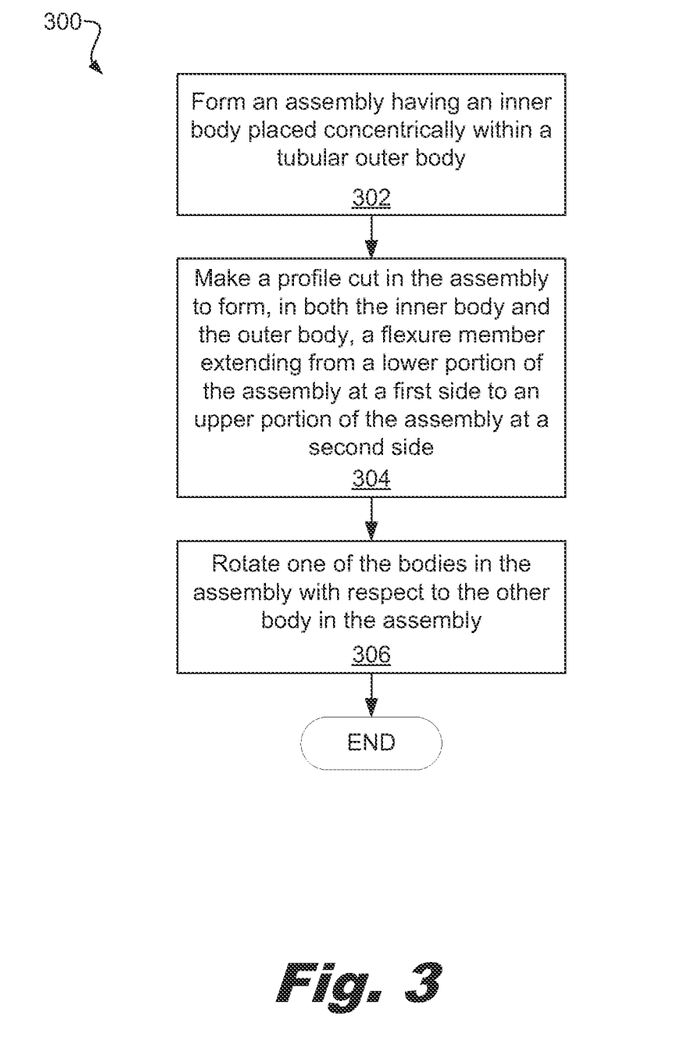
FIG. 3 is a flowchart showing an illustrative method of fabricating a cross-flexural pivot, according to one example of principles described herein.
Figure 4A:
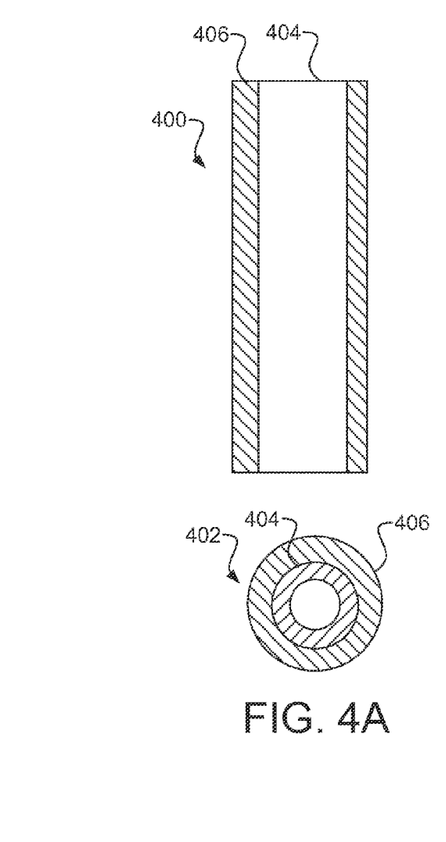
FIGS. 4A, 4B, and 4C are cut-away side views of different stages in an illustrative process of fabricating a cross-flexural pivot, according to one example of principles described herein.
Figure 4B:
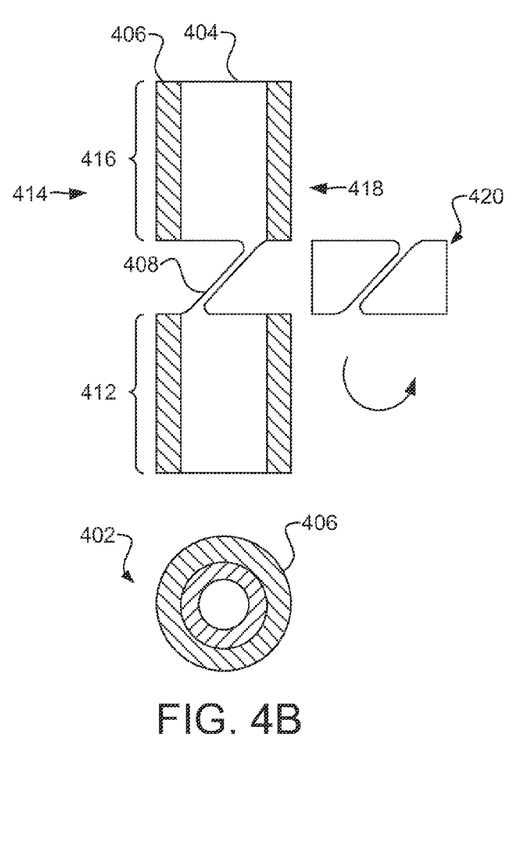
Figure 4C:
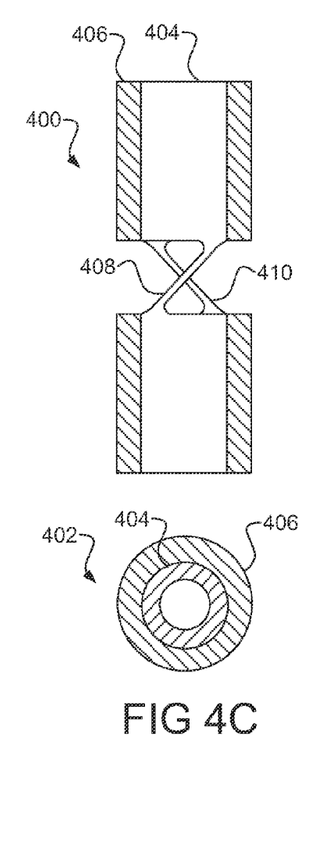

FIG. 3 is a flowchart of an illustrative process (300) of fabricating a cross-flexural pivot. FIGS. 4A-4C illustrate cut-away side views and cross-sectional views of different stages in the illustrative process of fabricating a cross-flexural pivot (100, FIG. 1). The illustrative process (300) may be applied to a tube-in-tube configuration with a hollow cross-section (402), as shown in FIGS. 4A-4C, or to a rod-in-tube configuration with a solid cross-section (not shown). By applying the process (300) to the tube-in-tube configuration, a cross-flexural pivot (100) having a channel for the insertion of tools or other devices will be produced, similar to that shown in FIGS. 1A-1C. By contrast, the application of the process (300) to the rod-in-tube configuration will produce a more rigid, resilient, cross-flexural pivot without a channel for the insertion of tools or other devices.

The process (300) includes forming (block 302) an assembly (400) having an inner body (404) placed concentrically within a tubular outer body (406). The formed assembly (400) is shown in FIG. 4A. In the side views of FIGS. 4A-4C, the tubular outer body (406) has been cut away to illustrate the placement of the inner body (404) with respect to the tubular outer body (406).

A planar profile cut is made (block 304) in the assembly (400) so as to form in the inner body (404) and the outer body (406) a flexure member (408, 410, respectively) extending from a lower portion (412) of the assembly (400) at a first side (414) to an upper portion (416) of the assembly (400) at a second side (418). FIG. 4B illustrates the assembly (400) after the profile cut has been made. Because the outer body (406) has been cut away, only the flexure member (408) of the inner body (404) is shown in FIG. 4B; however, the flexure member (410) for the outer body (406) will be substantially the same in shape and orientation as the flexure member (408) for the inner body (404). The material (420) removed from the inner body (404) is also shown in FIG. 4B.

One of the bodies (404, 406) is then rotated (block 306) with respect to the other of the bodies (404, 406) to produce the cross-flexure configuration shown in FIG. 4C. For example, the outer body (406) may be rotated 180 degrees to achieve the configuration shown in FIG. 4C, which is similar to the cross-flexure pivot (100) shown in FIGS. 1A-1C.

Figure 5A:
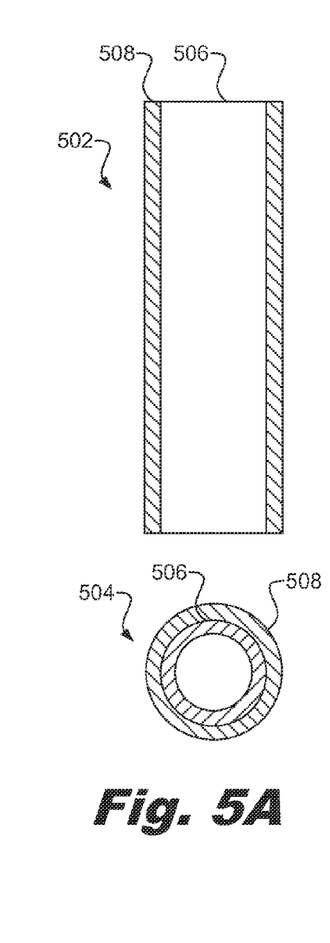
FIGS. 5A, 5B, 5C, and 5D illustrate partial cut-away side views and respective cross-sectional views of illustrative tubular materials that may be used to fabricate a cross-flexural pivot, according to examples of principles described herein.
Figure 5B:
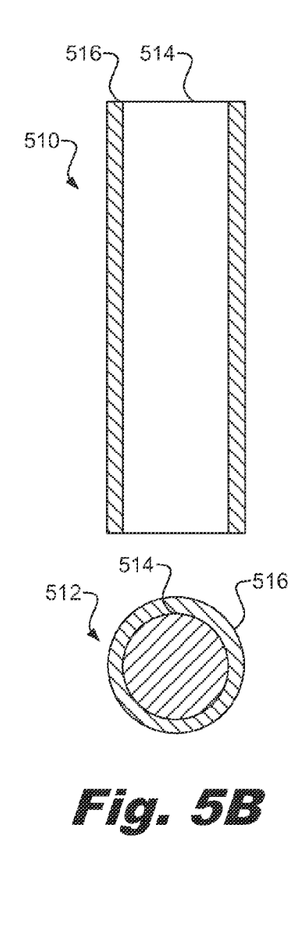
Figure 5C:
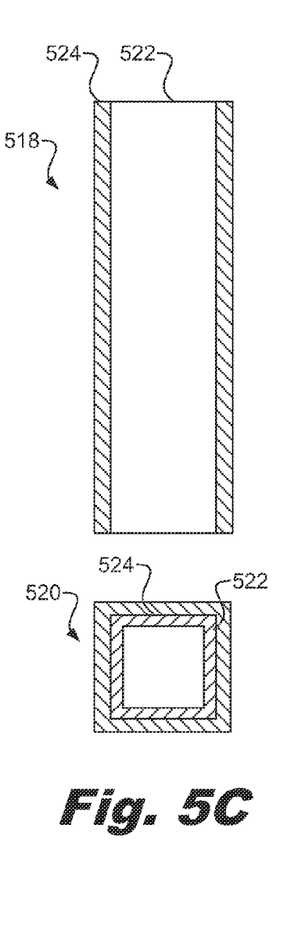
Figure 5D:
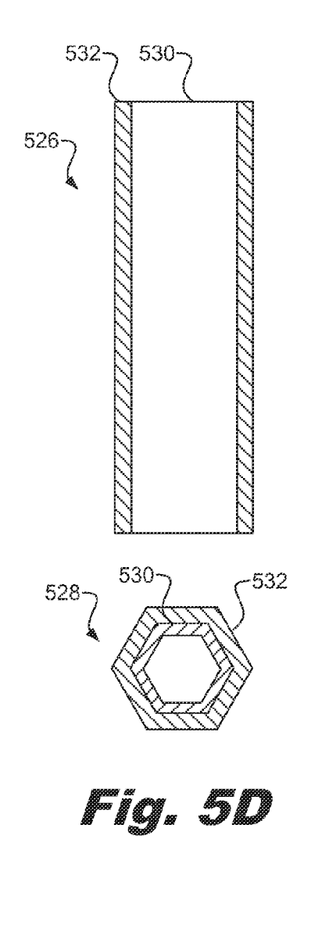

Referring now to FIGS. 5A-5D, a variety of different shapes may be used for the inner body (404) and outer body (406) of the assembly described in the process (300) of FIG. 3. FIG. 5A illustrates a cut-away side view (502) and cross-sectional view (504) of an illustrative assembly having a tubular cylindrical inner body (506) and a tubular cylindrical outer body (508). FIG. 5B illustrates a cut-away side view (510) and cross-sectional view (512) of an illustrative assembly having a solid cylindrical inner body (514) and a tubular cylindrical outer body (516). FIG. 5C illustrates a cut-away side view (518) and cross-sectional view (520) of an illustrative assembly having a tubular rectangular inner body (522) and a tubular rectangular outer body (524). FIG. 5D illustrates a cut-away side view (526) and cross-sectional view (528) of an illustrative assembly having a tubular polygonal inner body (530) and a tubular polygonal outer body (532).

Figure 6:
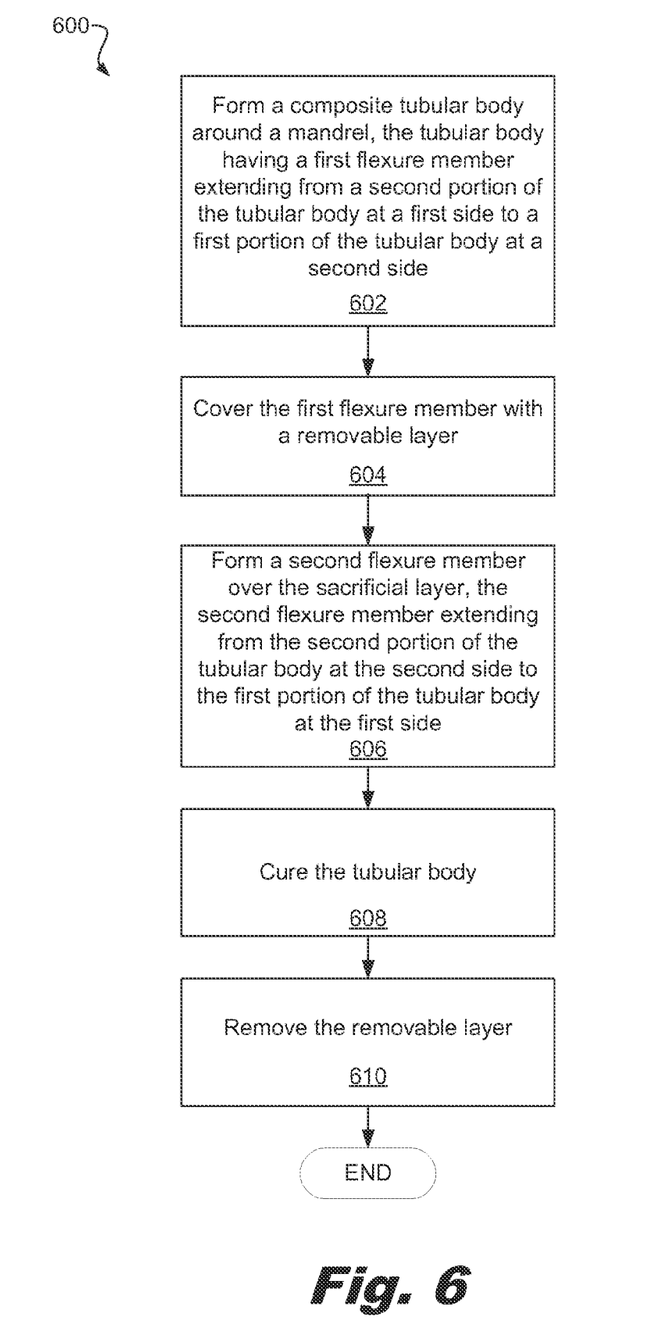
FIG. 6 is a flowchart showing an illustrative method of fabricating a cross-flexural pivot, according to one example of principles described herein.
Figure 7A:
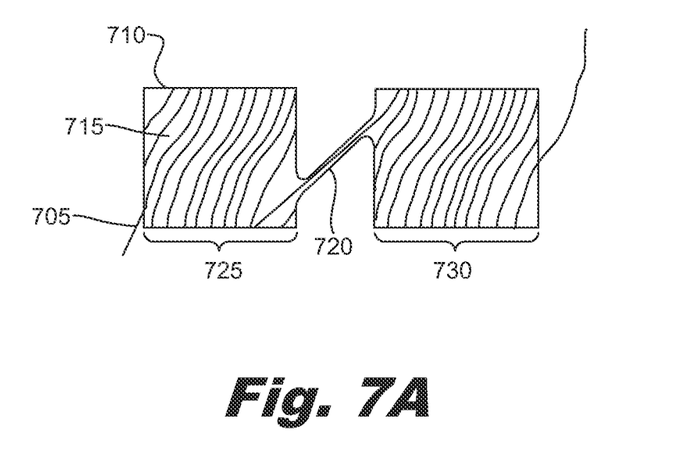
FIGS. 7A, 7B, and 7C are side views of different stages in an illustrative process of fabricating a cross-flexural pivot, according to one example of principles described herein.
Figure 7B:
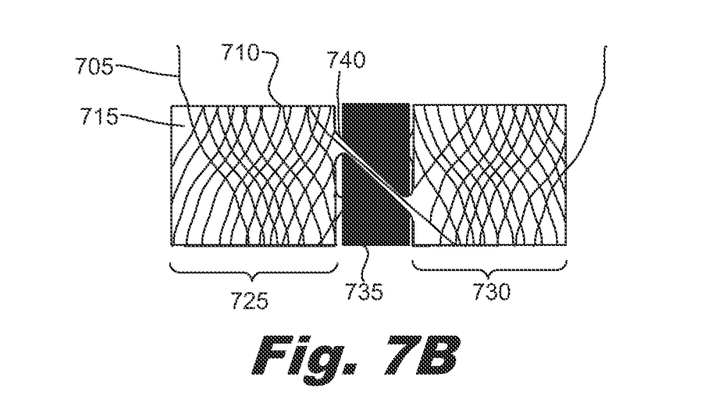
Figure 7C:
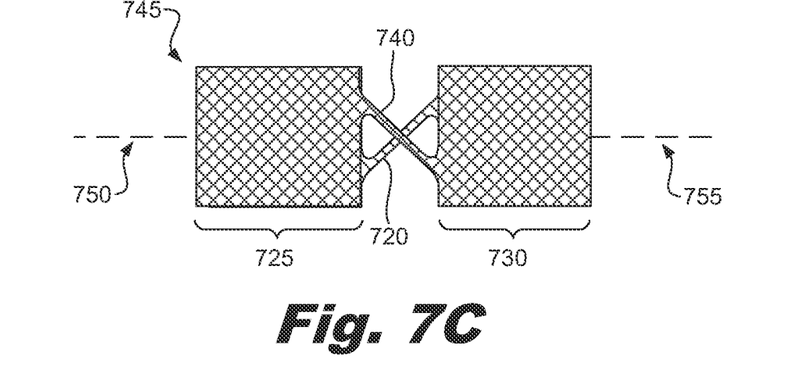

FIG. 6 is a flowchart of an illustrative process (600) of fabricating a cross-flexural pivot consistent with the principles described herein from a composite material. FIGS. 7A-7C illustrate different stages of the process (600) described in FIG. 6. As contrasted with the tube-in-tube or rod-in-tube pivots produced by the process (300) described in FIGS. 3-5, the illustrative process (600) depicted in FIGS. 6-7 may be used to produce a composite cross-flexural pivot as a single integral composite structure using conventional filament wrapping composite techniques.

In the process (600) of FIG. 6, a composite tubular body (710) is formed (block 602) around a mandrel, as shown in FIG. 7A. FIG. 7A omits the mandrel for clarity. The tubular body (710) has a first flexure member (720) extending from a first portion (725) of the tubular body (710) at a first side to a second portion (730) of the tubular body (710) at a second side. The mandrel is not shown in FIG. 7A for clarity. As shown in FIG. 7A, the first and second portions (725, 730) of the composite tubular body (710) and the first flexure member (720) may be formed by wrapping a filament (705) around the mandrel and introducing a matrix material (715) into the wrapped filament (705).

The filament (705) may be made from any type of material that can be used in the fabrication of composite materials, as may suit a particular application of the principles described herein. Examples of suitable filament materials include, but are not limited to, carbon fiber, glass, plastics, other polymers aramids), metal wire, and the like. Similarly, the matrix material (715) may be any type of matrix material that can be used in the fabrication of composite materials, as may suit a particular application of the principles described herein. Examples of suitable matrix materials include, but are not limited to, polymer resins and epoxies, plastics (e.g., thermosetting plastics or thermoplastics), solder materials, and braze materials (e.g., where the filament material is metallic).

After forming the first flexure member (720), the first flexure member (720) is covered (block 604) with a removable layer (735), and a second flexure member (740) is formed (block 606) over the removable layer (735), as shown in FIG. 7B. The removable layer (735) may be made of any material that can be removed from the composite material after curing (i.e., any material that will not bond the edges of different layers of composite material together), as may suit a particular application of the principles described herein. Examples of suitable removable layers (735) include, but are not limited to, various types of release films made from plastic sheeting coated so as not to bond with the matrix material (715), foil materials that prevent the flow of a resin matrix material (715) between layers of the composite tubular body (710), materials that can be dissolved by heat, acid, or water, and/or any other material that can withstand the fabrication of the tubular body (710) and be chemically or mechanically removed after the tubular body (710) has cured.

The second flexure member (740) extends from the first portion (725) of the tubular body (710) at the second side to the upper portion (730) of the tubular body (710) at the first side. Once the tubular body (710), including the flexures (720, 740), has been cured (block 608), the removable layer (735) can be removed (block 610), leaving a single integral composite cross-flexural pivot (745), shown in FIG. 7C. As with the other cross-flexural pivots described in the present specification, the composite cross-flexural pivot has a first structure (725) (also referred to as the first portion of the tubular body (710) having a first longitudinal axis (750), a second structure (730) (also referred to as the second portion of the tubular body (710)) having a second longitudinal axis (755), an inner flexure member (720) (also referred to as the first flexure member), and an outer flexure member (740) (also referred to as the second flexure member). The inner flexure member (720) is coupled to the first structure (725) at a first side and to the second structure (730) at a second side opposing the first side. The second flexure member (740) has a curved periphery that encloses the inner flexure member (720) and is coupled to the first structure (725) at the second side and to the second structure (730) at the first side. Each of the flexure members (720, 740) has a face disposed obliquely to the first and second longitudinal axes (750, 755). Because the flexure members (720, 740) are formed by wrapping filament (720) around a cylindrical mandrel, each of the flexure members (720, 740) shown in FIG. 7C may be substantially tubular and concentric to the first structure (725) and the second structure (740) when the pivot (745) is not being flexed.

Figure 8A:
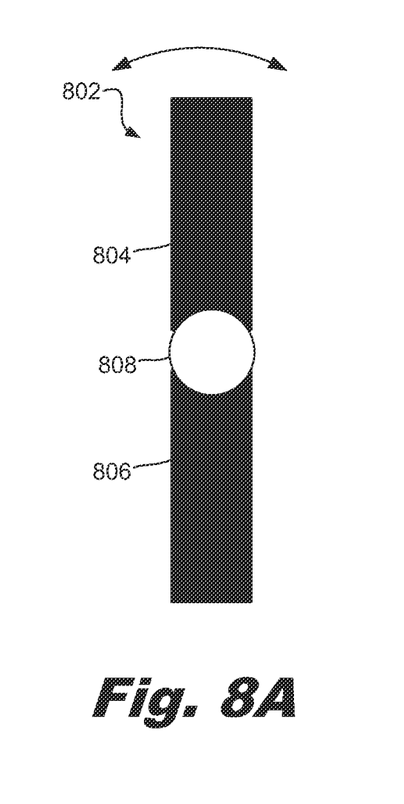
FIGS. 8A, 8B, and 8C are side views of an illustrative use of a pivoting tool with a cross-flexural pivot, according to one example of principles described herein.
Figure 8B:
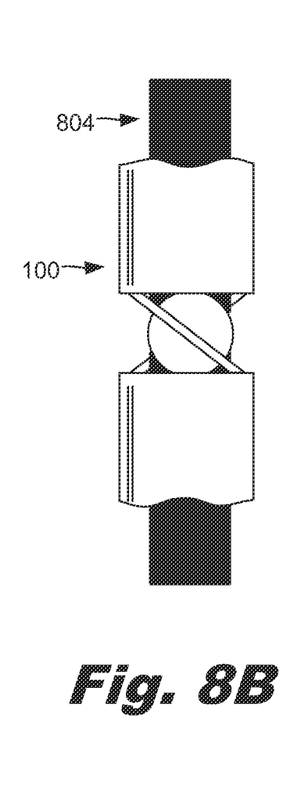
Figure 8C:
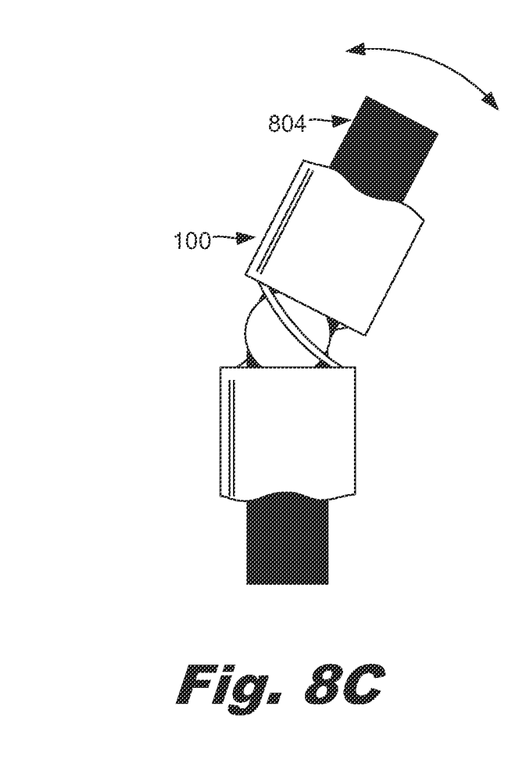

FIGS. 8A-8C an illustrative use of a cross-flexural pivot (100) consistent with the principles described herein to house an illustrative pivoting tool (802). In FIG. 8A, the pivoting tool (802) is shown. The pivoting tool (802) may include a first portion (804), a second portion (806), and a joint (808) that allows the first portion (804) to pivot with respect to the second portion (806). FIG. 8B shows the pivoting tool (802) disposed within a cross-flexural pivot (100) similar to that shown in FIGS. 1A-C. The cross-flexural pivot (100) may be a component of, for example, a snake tool used to guide the pivoting tool (802) through a passageway and/or to control the motion of the pivoting tool (802). FIG. 8C shows the illustrative pivoting tool (802) pivoting while the cross-flexural pivot (100) is in a state of flexure.

Figure 9A:
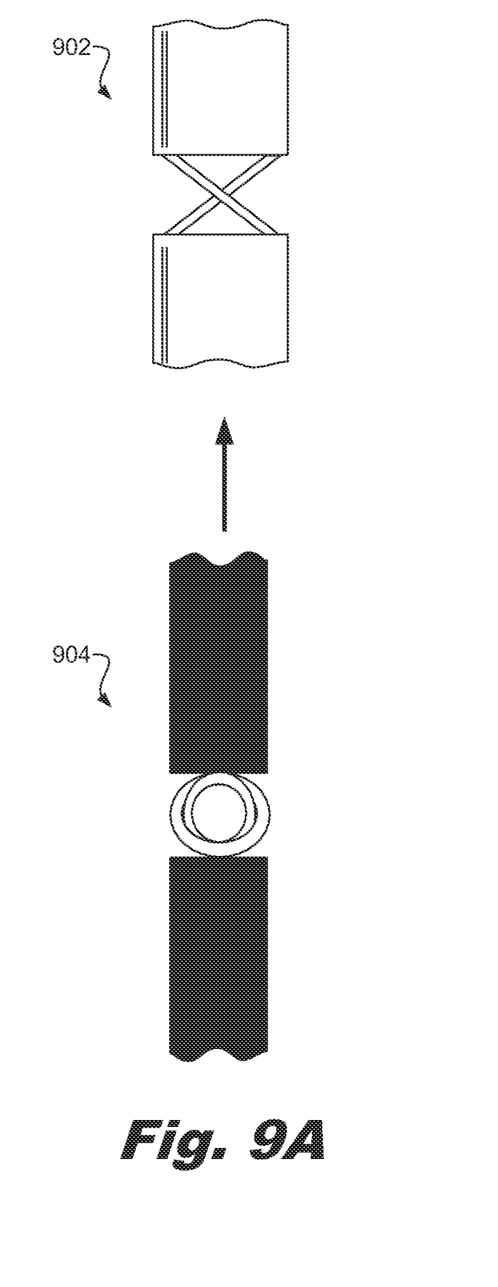
FIGS. 9A, 9B, 9C, 9D, 9E, and 9F are side views of illustrating nesting cross-flexural pivots, according to examples of principles described herein.
Figure 9B:
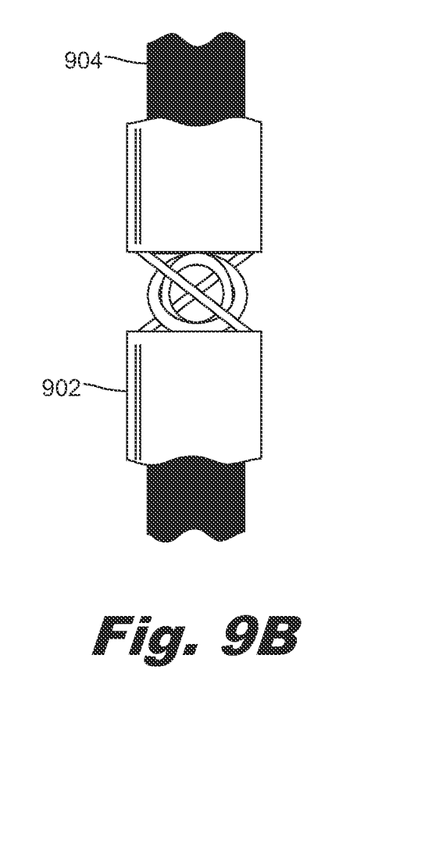

FIGS. 9A and 9B illustrate the nesting of a first cross-flexural pivot (902) consistent with the principles described herein within a second cross-flexural pivot (904) consistent with the principles described herein. As shown in FIG. 9A, the first cross-flexural pivot (902) may be oriented such that its pivot axis is the z-axis in a standard Cartesian system (i.e., perpendicular to the page of FIG. 9A). The second cross-flexural pivot (904) may be oriented such that its pivot axis is the y-axis in a standard Cartesian system (i.e., parallel to the width of the page of FIG. 9A). The second cross-flexural pivot (904) may be fabricated to have a smaller width than the first cross-flexural pivot (902) such that the second cross-flexural pivot (904) can be disposed concentrically within the first cross-flexural pivot (902). Such a configuration is shown in FIG. 9B, where both the inner and outer flexures of the first cross-flexural pivot (902) enclose the flexures of the second cross-flexural pivot (904). This configuration performs a nested pivot assembly which may substantially reduce the amount of pivot flexure allowed along either the z-axis or the y-axis. If the second cross-flexural pivot (904) is tubular, the nested pivot assembly shown in FIG. 9B may be used as a snake or other pivoting receptacle, such as in the example described in FIGS. 8A-8C.

Figure 9C:
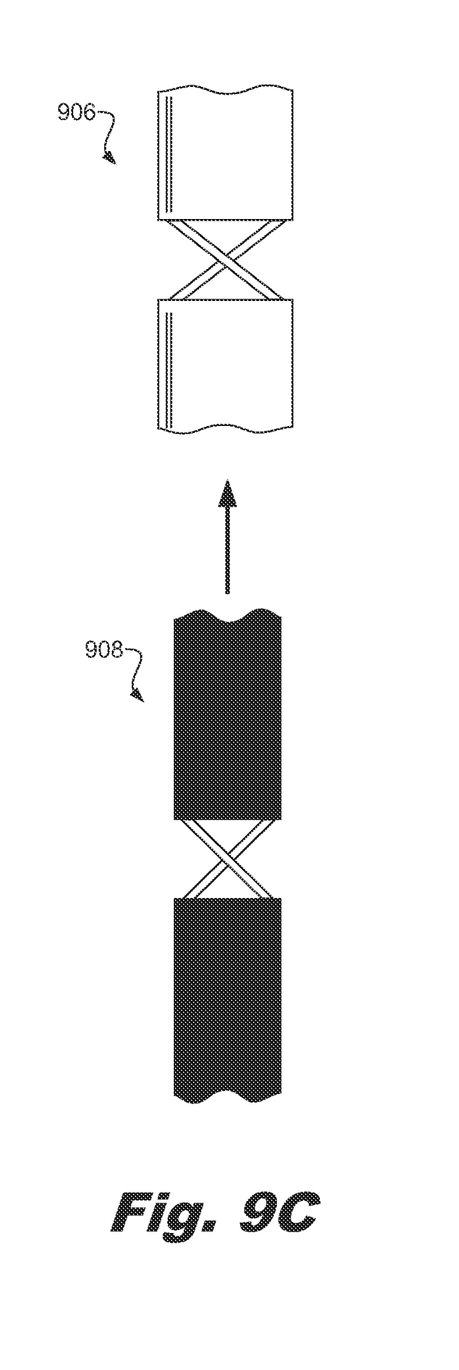
Figure 9D:
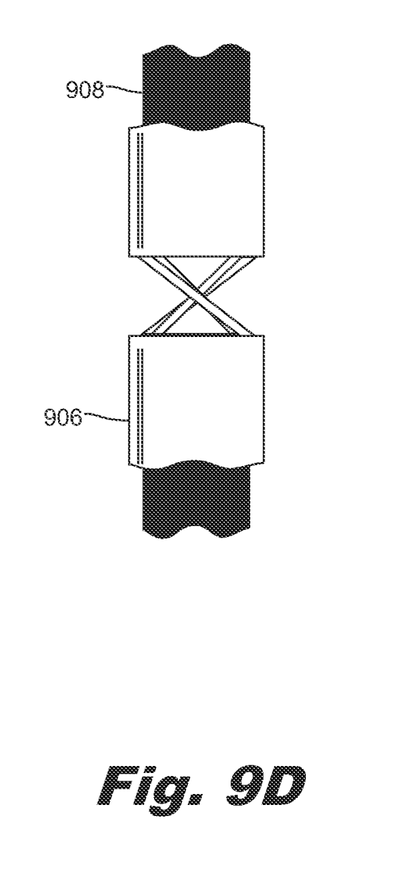

FIGS. 9C and 9D illustrate another method of nesting cross-flexural pivots consistent with the principles described herein. FIG. 9C illustrates a first cross-flexural pivot (906) and a second cross-flexural pivot (908). The first cross-flexural pivot (906) is configured to concentrically house the second cross-flexural pivot (908) in much the same way described in FIGS. 9A and 9B. However, in this example, the first and second cross-flexural pivots (906, 908) are oriented such that their pivot axes are parallel, if not collinear. FIG. 9D illustrates the nesting of the second cross-flexural pivot (908) within the first cross-flexural pivot (906). In this example, the first cross-flexural pivot (906) may have a first spring constant, the second cross-flexural pivot (908) may have a second spring constant, and a third spring constant may be obtained by nesting the cross-flexural pivots (906, 908). Additionally or alternatively, the first cross-flexural pivot (906) and the second cross-flexural pivot (908) may be oriented such that their respective pivot axes are neither perpendicular nor parallel. The degree of stiffness of the nested pivot assembly may be controlled by adjusting the orientation of the pivot axis of the first cross-flexural pivot (906) with respect to the pivot axis of the second cross-flexural pivot (908).

Figure 9E:
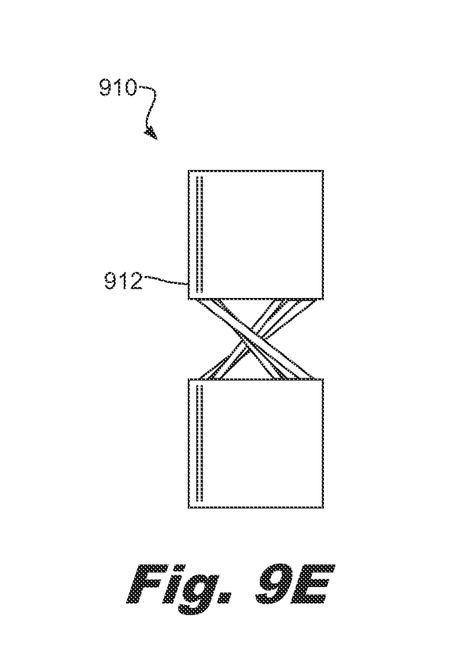
Figure 9F:
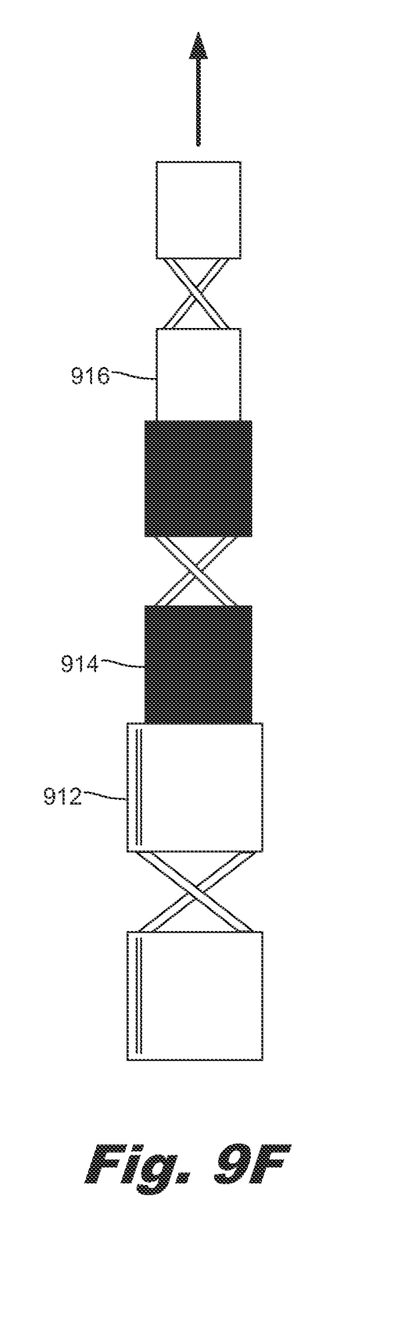

FIGS. 9E and 9F illustrate yet another exemplary method of nesting cross-flexural pivots (912, 914, 916). FIG. 9E illustrates an assembly (910) in which a first cross-flexural pivot (912) concentrically houses second and third cross-flexural pivots (914, 916). The second cross-flexural pivot (914) is slidably disposed within the first cross-flexural pivot (912) such that the second cross-flexural pivot (914) may move along the longitudinal axis of the assembly with respect to the first cross-flexural pivot (912). The third cross-flexural pivot (916) is slidably disposed within the second cross-flexural pivot (91.4) in much the same way. Under this arrangement, the cross-flexural pivots (912, 914, 916) may be selectively collapsed into the single assembly (910) shown in FIG. 9E or expanded into a series of three separate pivots (912, 914, 916), as shown in FIG. 9F.

The lower portion of the outer surface of the second cross-flexural pivot (914) may include a mechanical feature (not shown) which mates with a complementary mechanical feature (e.g., complementary lip and groove or other locking feature) on the upper portion of the inner surface of the first cross-flexural pivot (912) to prevent the second cross-flexural pivot (914) from sliding completely out of the first cross-flexural pivot (912). Similarly, the lower portion of the outer surface of the third cross-flexural pivot (916) may include a mechanical feature (not shown) which mates with a complementary mechanical feature (e.g., complementary lip and groove or other locking feature) on the upper portion of the inner surface of the second cross-flexural pivot (914) to prevent the third cross-flexural pivot (916) from sliding completely out of the first cross-flexural pivot (914).

Figure 10A:
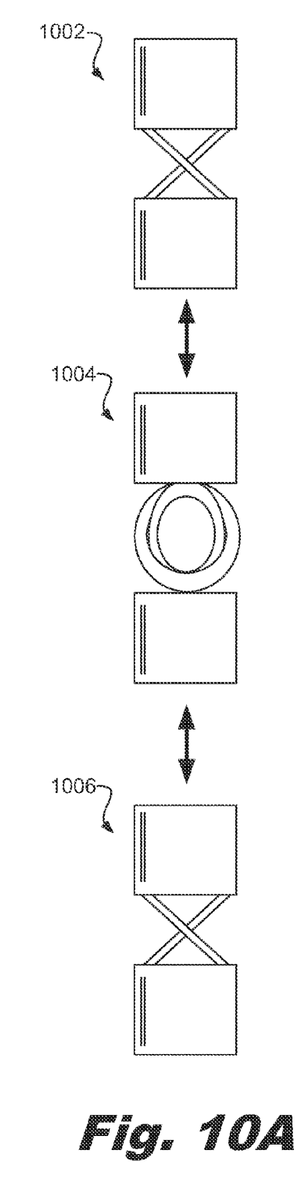
FIGS. 10A, 10B, and 10C are side views illustrating the use of multiple cross-flexural pivots in series, according to examples of principles described herein.
Figure 10B:
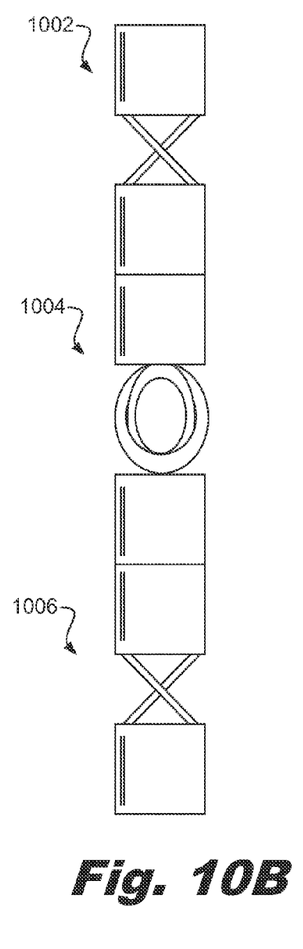
Figure 10C:
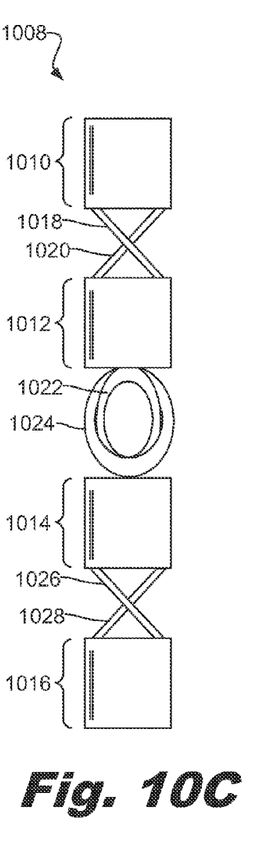

FIGS. 10A-10C illustrate the use of multiple cross-flexural pivots, consistent with the principles described herein, in a series arrangement. FIG. 10A shows first, second, and third cross-flexural pivots (1002, 1004, 1006, respectively). The first and third cross-flexural pivots (1002, 1006) are oriented such that their pivot axis is along the z-axis. The second cross-flexural pivot (1004) is oriented such that its pivot axis is along the y-axis. Alternatively, the pivot axes of the cross-flexural pivots (1002, 1004, 1006) may be oriented in any configuration that may suit a particular application of the principles described herein. As shown in FIG. 10B, the first, second, and third cross-flexural pivots (1002, 1004, 1006) may be coupled together to form a series pivot assembly.

FIG. 10C shows a cross-flexural pivot assembly (1008) having multiple joints that may be formed all at once during fabrication. The assembly (1008) includes a first structure (1010), a second structure (1012), a third structure (1014), and a fourth structure (1016). Each of the structures (1010, 1012, 1014, 1016) has a longitudinal axis (not shown).

A first inner flexure (1018) is disposed obliquely to the longitudinal axes of the first and second structures (1010, 1012) and coupled to the first structure (1010) at a first side and to the second structure (1012) at a second side. A first outer flexure (1020) has a curved periphery that encloses the first inner flexure (1018). The first outer flexure (1020) is disposed obliquely to the longitudinal axes of the first and second structures (1010, 1012) and coupled to the first structure (1010) at the second side and to the second structure (1012) at the first side.

A second inner flexure (1022) is disposed obliquely to the longitudinal axes of the second and third structures (1012, 1014) and coupled to the second structure (1012) at a third side and to the third structure (1014) at a fourth side. A second outer flexure (1024) has a curved periphery that encloses the second inner flexure (1022). The second outer flexure (1024) is disposed obliquely to the longitudinal axes of the second and third structures (1012, 1014) and coupled to the second structure (1012) at the fourth side and to the third structure (1014) at the third side.

A third inner flexure (1026) is disposed obliquely to the longitudinal axes of the third and fourth structures (1014, 1016) and coupled to the third structure (1014) at the first side and to the fourth structure (1016) at the second side. A third outer flexure (1028) has a curved periphery that encloses the third inner flexure (1026). The third outer flexure (11028) is disposed obliquely to the longitudinal axes of the third and fourth structures (1014, 1016) and coupled to the third structure (1014) at the second side and to the fourth structure (1016) at the first side.

It will be readily apparent to those having skill in the art that the assembly (1008) shown in FIG. 10C may be fabricated by a simple modification of the cut-and-turn process (300) described in FIGS. 3-4 to include multiple planar cuts oriented so as to create the desired pivot angles. Similarly, the assembly (1008) may be fabricated using the composite method described in FIGS. 6-7 by wrapping the filament to include a first set of flexure members (the flexure members may be wrapped at different angles and orientations as desired), depositing the sacrificial material over each flexure member in the first set of flexure members, and forming a second set of flexure members over the first set of flexure members consistent with the methods of FIGS. 6-7.

In conclusion, this specification has described various examples of a new and useful cross-flexural pivot and methods of fabricating the cross-flexural pivot. The cross-flexural pivot provides many advantages, including the advantages associated with simple manufacture, environmental robustness, lack of friction and stiction, and versatility in manufacturing materials.

The flowchart and block diagrams in the Figures illustrate the architecture, functionality, and operation of possible implementations of systems and methods according to various examples of the principles described herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:
1. A cross-flexural pivot, comprising:
a first structure comprising a first longitudinal axis;
a second structure comprising a second longitudinal axis;
a third structure comprising a third longitudinal axis;
a first inner flexure member comprising a face disposed obliquely to said first and second longitudinal axes, said first inner flexure member being coupled to said first structure at a first side and coupled to said second structure at a second side opposing said first side;
a first outer flexure member comprising a curved periphery enclosing said first inner flexure member and a face disposed obliquely to said first and second longitudinal axes, said first outer flexure member being coupled to said first structure at said second side and to said second structure at said first side;

a second inner flexure member comprising a face disposed obliquely to said second and third longitudinal axes, said second inner flexure member being coupled to said second structure at a third side and coupled to said third structure at a fourth side opposing said third side;

a second outer flexure member comprising a curved periphery enclosing said second inner flexure member and a face disposed obliquely to said second and third longitudinal axes, said second outer flexure member being coupled to said second structure at said fourth side and to said third structure at said third side;

in which said first structure is configured to pivot with respect to said second structure along a pivot axis, said pivot axis being substantially perpendicular to said second longitudinal axis.

2. The cross-flexural pivot of claim 1, wherein said face of said inner flexure member and said face of said outer flexure member are substantially annular.

3. The cross-flexural pivot of claim 1, wherein said face of said inner flexure member and said face of said outer flexure member are substantially flat.

4. The cross-flexural pivot of claim 1, wherein each of said first structure and said second structure are substantially cylindrical.

5. The cross-flexural pivot of claim 1, wherein each of said first structure and said second structure comprises a tubular shape with a substantially polygonal cross-section.

6. The cross-flexural pivot of claim 1, wherein at least one of said first structure and said second structure is tubular.

7. The cross-flexural pivot of claim 1, wherein each of said first structure and said second structure comprises a tubular outer body and an inner body disposed concentrically within said outer body.

8. The cross-flexural pivot of claim 7, wherein said inner flexure member couples said inner body of said first structure to said inner body of said second structure; and said outer flexure member couples said outer body of said first structure to said outer body of said second structure.

9. The cross-flexural pivot of claim 1, wherein said first structure is configured to pivot with respect to said second structure along a first pivot axis and said second structure is configured to pivot with respect to said third structure along a second pivot axis, said second pivot axis being different from said first pivot axis.

10. The cross-flexural pivot of claim 1, further comprising:
a third structure disposed within and concentric to said first structure;
a fourth structure disposed within and concentric to said second structure;
a second inner flexure member comprising a face disposed obliquely to said first and second longitudinal axes, said second inner flexure member being coupled to said third structure at a third side and coupled to said fourth structure at a fourth side;
a second outer flexure member comprising a curved periphery enclosing said second inner flexure member and a face disposed obliquely to said first and second longitudinal axes, said second outer flexure member being coupled to said third structure at said fourth side and to said fourth structure at said third side.

11. The cross-flexural pivot of claim 10, wherein said third side is the same as one of said first side and said second side; and wherein said fourth side is the same as the other of said first side and said second side.

12. The cross-flexural pivot of claim 10, wherein said third structure and said fourth structure are configured to at least partially slide out of said first structure and said second structure; such that said second inner flexure member and said second outer flexure member are disposed outside of said first structure and said second structure, and a portion of said fourth structure remains disposed within said first structure.

13. A cross-flexural pivot, comprising:
a first structure comprising a first longitudinal axis;
a second structure comprising a second longitudinal axis;
a third structure disposed within and concentric to said first structure;
a fourth structure disposed within and concentric to said second structure;
a first inner flexure member comprising a face disposed obliquely to said first and second longitudinal axes, said inner flexure member being coupled to said first structure at a first side and coupled to said second structure at a second side opposing said first side;
a second inner flexure member comprising a face disposed obliquely to said first and second longitudinal axes, said second inner flexure member being coupled to said third structure at a third side and coupled to said fourth structure at a fourth side;
a first outer flexure member comprising a curved periphery enclosing said inner flexure member and a face disposed obliquely to said first and second longitudinal axes, said outer flexure member being coupled to said first structure at said second side and to said second structure at said first side; and
a second outer flexure member comprising a curved periphery enclosing said second inner flexure member and a face disposed obliquely to said first and second longitudinal axes, said second outer flexure member being coupled to said third structure at said fourth side and to said fourth structure at said third side;
in which said third structure and said fourth structure are configured to at least partially slide out of said first structure and said second structure; such that said second inner flexure member and said second outer flexure member are disposed outside of said first structure and said second structure, and a portion of said fourth structure remains disposed within said first structure.

14. The cross-flexural pivot of claim 13, in which:
said first structure is configured to pivot with respect to said second structure along a first pivot axis, said pivot axis being substantially perpendicular to said second longitudinal axis;
said third structure is configured to pivot with respect to said fourth structure along a second pivot axis, said pivot axis being substantially perpendicular to said second longitudinal axis.

15. The cross flexural pivot of claim 14, in which the first pivot axis and second pivot axis are perpendicular.

16. The cross flexural pivot of claim 14, in which the first pivot axis and second pivot axis are collinear.

* * * * *